United States Patent
Lindmark (10) Patent No.: US 12,229,389 B2
(45) Date of Patent: Feb. 18, 2025

(54) INTERACTIVE PLAYBACK OF A VIDEO CONFERENCE

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/197,666

(22) Filed: May 15, 2023

(65) Prior Publication Data

US 2024/0385734 A1    Nov. 21, 2024

(51) Int. Cl.
  *G06F 3/0484*  (2022.01)
  *H04L 65/403*  (2022.01)
  *H04N 5/92*    (2006.01)

(52) U.S. Cl.
  CPC .......... *G06F 3/0484* (2013.01); *H04L 65/403* (2013.01); *H04N 5/9201* (2013.01)

(58) Field of Classification Search
  CPC .... G06F 3/0484; H04L 65/403; H04N 5/9201
  See application file for complete search history.

(56) References Cited

U.S. PATENT DOCUMENTS

| | | | | |
|---|---|---|---|---|
| 6,332,147 B1 * | 12/2001 | Moran | ................ | G06F 16/489 |
| | | | | 715/231 |
| 7,464,137 B2 * | 12/2008 | Zhu | ................... | H04L 12/1831 |
| | | | | 709/248 |
| 8,667,401 B1 * | 3/2014 | Lozben | ............... | G06F 3/0481 |
| | | | | 715/756 |

(Continued)

FOREIGN PATENT DOCUMENTS

| | | | | |
|---|---|---|---|---|
| WO | WO-2021168160 A1 * | 8/2021 | ......... | H04L 65/1069 |
| WO | WO-2024010641 A1 * | 1/2024 | ........... | G06F 16/489 |

OTHER PUBLICATIONS

How can I start a video at specific timestamp in React?, retrieved from—https://stackoverflow.com/questions/70144952/how-can-i-start-a-video-at-specific-timestamp-in-react, Nov. 28, 2021, 4 pages (Year: 2021).*

(Continued)

*Primary Examiner* — Yongjia Pan
(74) *Attorney, Agent, or Firm* — Lowenstein Sandler LLP (57) ABSTRACT

Systems and methods for interactive playback of a video conference are provided. A request is received for a playback of a video conference between a plurality of participants of a plurality of client devices that each generated one of a plurality of source video streams, where each source video stream was presented during a live stream of the video conference according to a particular layout in a user interface (UI) on a first client device of the plurality of client devices. Playback of the video conference is caused at a second client device, wherein causing playback of the video conference comprises transmitting, to a second client device, each source video stream of the plurality of source video streams for visual rendering according to the particular layout in a UI on the second client device; and capturing a first set of user interaction events associated with one or more time points during playback of the video conference, wherein each user interaction event of the first set is visually rendered at a corresponding time point during playback of the video conference.

16 Claims, 5 Drawing Sheets

(56) References Cited

U.S. PATENT DOCUMENTS

| | | | |
|---|---|---|---|
| 9,112,980 B2* | 8/2015 | Jones | H04M 3/56 |
| 9,256,632 B2* | 2/2016 | Chan | H04L 12/1831 |
| 10,798,341 B1* | 10/2020 | Hegde | H04N 21/8549 |
| 11,681,819 B1* | 6/2023 | Surazski | G06F 16/9535 |
| | | | 726/28 |
| 11,710,509 B1* | 7/2023 | Bhupati | G11B 27/34 |
| | | | 386/282 |
| 2003/0220973 A1* | 11/2003 | Zhu | H04L 12/1831 |
| | | | 709/205 |
| 2008/0008458 A1* | 1/2008 | Gudipaty | H04N 7/147 |
| | | | 348/E7.083 |
| 2008/0263010 A1* | 10/2008 | Roychoudhuri | |
| | | | H04N 21/25808 |
| | | | 348/E7.083 |
| 2009/0046139 A1 | 2/2009 | Cutler et al. | |
| 2010/0053302 A1* | 3/2010 | Ivashin | H04N 7/147 |
| | | | 348/14.08 |
| 2011/0249954 A1* | 10/2011 | Meek | H04N 7/147 |
| | | | 386/239 |
| 2013/0198288 A1* | 8/2013 | Jones | H04L 65/1066 |
| | | | 709/204 |
| 2013/0339431 A1* | 12/2013 | Yannakopoulos | |
| | | | H04L 12/1831 |
| | | | 709/204 |
| 2015/0358581 A1* | 12/2015 | Zhou | H04N 7/15 |
| | | | 348/14.07 |
| 2016/0182851 A1* | 6/2016 | Girgensohn | H04N 9/8205 |
| | | | 386/230 |
| 2018/0027123 A1* | 1/2018 | Cartwright | H04M 3/42221 |
| | | | 379/202.01 |
| 2018/0227138 A1* | 8/2018 | Faulkner | H04L 12/1831 |
| 2018/0307383 A1 | 10/2018 | Faulkner et al. | |
| 2019/0028667 A1 | 1/2019 | Faulkner | |
| 2019/0236547 A1* | 8/2019 | Huang | H04L 65/4015 |
| 2021/0058585 A1* | 2/2021 | Hegde | H04N 21/42204 |
| 2022/0206673 A1* | 6/2022 | Zhan | G11B 27/031 |
| 2023/0132639 A1* | 5/2023 | Swerdlow | H04L 12/1822 |
| | | | 709/204 |
| 2023/0154497 A1* | 5/2023 | Malan | H04L 65/752 |
| | | | 386/278 |
| 2024/0013158 A1* | 1/2024 | Zahavi | G06F 40/284 |

OTHER PUBLICATIONS

Recording Locally On Your Computer, Dec. 12, 2021, retrieved from—https://www.youtube.com/watch?v=wXgJWxGpl3o, 9 pages (Year: 2021).*

How to Modify Screen Layout for Recordings in WebEx, Aug. 3, 2022, retrieved from—https://web.archive.org/web/20220803162339/https://www.asurams.edu/docs/its/pdfs/How%20to%20Modify%20Screen%20Layout%20for%20Recordings%20in%20WebEx%20Meetings%20and%20WebEx%20Events.pdf, 1 page (Year: 2022).*

How to record gallery view in Zoom, Mar. 30, 2021, retrieved from—https://www.youtube.com/watch?v=9vK7ECvESec, 1 page (Year: 2021).*

International Search Report and Written Opinion for International Application No. PCT/US2024/028964, mailed Aug. 30, 2024, 17 pages.

Microsoft: "Microsoft Teams Meetings Quick Start Guide," Mar. 11, 2021, 31 Pages, Retrieved from [https://www.microsoft.com/cms/api/am/binary/RWyUxX].

* cited by examiner

INTERACTIVE PLAYBACK OF A VIDEO CONFERENCE

TECHNICAL FIELD

Aspects and implementations of the present disclosure relate to interactive playback of a video conference.

BACKGROUND

Video conferences can take place between multiple participants via a video conference platform. A video conference platform includes tools that allow multiple client devices to be connected over a network and share each other's audio (e.g., the voice of a user recorded via a microphone of a client device) and/or video stream (e.g., a video captured by a camera of a client device, or video captured from a screen image of the client device) for communication. In some instances, the video conference platform can provide a recording of the video conference to one or more client devices for playback of the video conference.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes receiving a request for a playback of a video conference between a plurality of participants of a plurality of client devices that each generated one of a plurality of source video streams, where each source video stream was presented during a live stream of the video conference according to a particular layout in a user interface (UI) on a first client device of the plurality of client devices. The method further includes causing playback of the video conference at a second client device, wherein causing playback of the video conference includes transmitting, to the second client device, each source video stream of the plurality of source video streams for visual rendering according to the particular layout in a UI on the second client device. The method further includes capturing a first set of user interaction events associated with one or more time points during playback of the video conference, wherein each user interaction event of the first set is visually rendered at a corresponding time point during playback of the video conference.

In some implementations, the method further includes capturing, during the live stream of a video conference, the plurality of source video streams from the plurality of client devices of the plurality of participants, and a second set of user interaction events associated with one or more time points during the live stream of the video conference. In some implementations, each of the second set of user interaction events is visually rendered at a corresponding time point during playback of the video conference.

In some implementations, to capture the plurality of source video streams, the method includes identifying a source video stream currently visible in the UI of the first client device; and recording the source video stream for a time period during which the source video stream is currently visible in the UI of the first client device.

In some implementations, the method includes determining that the source video stream is no longer visible in the UI of the first client device. The method further includes pausing the recording of the source video stream until the source video stream becomes visible in the UI of the first client device.

In some implementations, the first set of user interaction events and the second set of user interaction events include one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants.

In some implementations, to cause playback of the video conference, the method further includes providing one or more UI elements for controlling playback of the video conference, wherein the one or more UI elements comprise: a play button, a pause button, a skip button, a rewind button, and a playback speed button.

In some implementations, to cause playback of the video conference, the method further includes determining a particular time point at which to initiate playback of the video conference, wherein the particular time point is set by a host participant of the video conference. The method further includes causing playback of the video conference to be initiated at the particular time point.

In some implementations, the method further includes storing the first set of user interaction events and the second set of user interaction events in a data channel, wherein the data channel comprises a mapping of each time point of the one or more time points and one or more user interaction events captured at each time point, and wherein each user interaction event of the first set of user interaction events and the second set of user interaction events in the data channel is visually rendered at the corresponding time point during subsequent playbacks of the video conference.

In some implementations, the first set of user interaction events is associated with a corresponding label indicating that the first set of user interaction events is captured during playback of the video conference, and the second set of user interaction events is associated with a corresponding label indicating that the second set of user interaction events is captured during the live stream of the video conference.

In some implementations, the first set of user interaction events is visually rendered at each associated time point during playback of the video conference in response to a permission setting enabled by a host participant of the video conference.

An aspect of the disclosure provides a system including a memory device and a processing device communicatively coupled to the memory device. The processing device performs operations including receiving a request for a playback of a video conference between a plurality of participants of a plurality of client devices that each generated one of a plurality of source video streams, wherein each source video stream was presented during a live stream of the video conference, according to a particular layout in a user interface (UI) on a first client device of the plurality of client devices. The processing device performs operations further including causing playback of the video conference at a second client device, wherein causing playback of the video conference includes transmitting, to the second client device, each source video stream of the plurality of source video streams for visual rendering according to the particular layout in a UI on the second client device. The processing device performs operations further including capturing a first set of user interaction events associated with one or more time points during playback of the video conference, wherein each user interaction event of the first set is visually rendered at a corresponding time point during playback of the video conference.

In some implementations, the processing device performs operations further including capturing, during the live stream of a video conference, the plurality of source video streams from the plurality of client devices of the plurality of participants, and a second set of user interaction events associated with one or more time points during the live stream of the video conference. In some implementations, each of the second set of user interaction events is visually rendered at a corresponding time point during playback of the video conference.

In some implementations, to capture the plurality of source video streams, the processing device performs operations further including identifying a source video stream currently visible in the UI of the first client device; and recording the source video stream for a time period during which the source video stream is currently visible in the UI of the first client device.

In some implementations, the processing device performs operations further including determining that the source video stream is no longer visible in the UI of the first client device. The processing device performs operations further including pausing the recording of the source video stream until the source video stream becomes visible in the UI of the first client device.

In some implementations, the first set of user interaction events and the second set of user interaction events include one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants.

In some implementations, to cause playback of the video conference, the processing device performs operations further including providing one or more UI elements for controlling playback of the video conference, wherein the one or more UI elements comprise: a play button, a pause button, a skip button, a rewind button, and a playback speed button.

In some implementations, to cause playback of the video conference, the processing device performs operations further including determining a particular time point at which to initiate playback of the video conference, wherein the particular time point is set by a host participant of the video conference. The processing device performs operations further including causing playback of the video conference to be initiated at the particular time point.

In some implementations, the processing device performs operations further including storing the first set of user interaction events and the second set of user interaction events in a data channel, wherein the data channel comprises a mapping of each time point of the one or more time points and one or more user interaction events captured at each time point, and wherein each user interaction event of the first set of user interaction events and the second set of user interaction events in the data channel is visually rendered at the corresponding time point during subsequent playbacks of the video conference.

In some implementations, the first set of user interaction events is associated with a corresponding label indicating that the first set of user interaction events is captured during playback of the video conference, and the second set of user interaction events is associated with a corresponding label indicating that the second set of user interaction events is captured during the live stream of the video conference.

In some implementations, the first set of user interaction events is visually rendered at each associated time point during playback of the video conference in response to a permission setting enabled by a host participant of the video conference.

An aspect of the disclosure provides a computer program including instructions that, when the program is executed by a processing device, cause the processing device to perform operations including receiving a request for a playback of a video conference between a plurality of participants of a plurality of client devices that each generated one of a plurality of source video streams, wherein each source video stream was presented during a live stream of the video conference according to a particular layout in a user interface (UI) on a first client device of the plurality of client devices. The processing device performs operations further including causing playback of the video conference at a second client device, wherein causing playback of the video conference includes transmitting, to the second client device, each source video stream of the plurality of source video streams for visual rendering according to the particular layout in a UI on the second client device. The processing device performs operations further including capturing a first set of user interaction events associated with one or more time points during playback of the video conference, wherein each user interaction event of the first set is visually rendered at a corresponding time point during playback of the video conference.

In some implementations, the processing device performs operations further including capturing, during the live stream of a video conference, the plurality of source video streams from the plurality of client devices of the plurality of participants, and a second set of user interaction events associated with one or more time points during the live stream of the video conference.

In some implementations, to capture the plurality of source video streams, the processing device performs operations further including identifying a source video stream currently visible in the UI of the first client device; and recording the source video stream for a time period during which the source video stream is currently visible in the UI of the first client device.

In some implementations, the processing device performs operations further including determining that the source video stream is no longer visible in the UI of the first client device. The processing device performs operations further including pausing the recording of the source video stream until the source video stream becomes visible in the UI of the first client device.

In some implementations, the first set of user interaction events and the second set of user interaction events include one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants.

In some implementations, to cause playback of the video conference, the processing device performs operations further including providing one or more UI elements for controlling playback of the video conference, wherein the one or more UI elements comprise: a play button, a pause button, a skip button, a rewind button, and a playback speed button.

In some implementations, to cause playback of the video conference, the processing device performs operations further including determining a particular time point at which to initiate playback of the video conference, wherein the particular time point is set by a host participant of the video conference. The processing device performs operations further including causing playback of the video conference to be initiated at the particular time point.

In some implementations, the processing device performs operations further including storing the first set of user interaction events and the second set of user interaction events in a data channel, wherein the data channel comprises a mapping of each time point of the one or more time points and one or more user interaction events captured at each time point, and wherein each user interaction event of the first set of user interaction events and the second set of user interaction events in the data channel is visually rendered at the corresponding time point during subsequent playbacks of the video conference.

In some implementations, the first set of user interaction events is associated with a corresponding label indicating that the first set of user interaction events is captured during playback of the video conference, and the second set of user interaction events is associated with a corresponding label indicating that the second set of user interaction events is captured during the live stream of the video conference.

In some implementations, each of the first set of user interaction events is visually rendered at each associated time point during playback of the video conference in response to a permission setting enabled by a host participant of the video conference.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects of the present disclosure relate to providing interactive playback of a video conference in a user interface (UI) of a video conference platform. A video conference platform can enable video-based conferences between multiple participants via respective client devices that are connected over a network and share each other's audio (e.g., the voice of a user recorded via a microphone of a client device) and/or video streams (e.g., a video captured by a camera of a client device) during a video conference. In some instances, a video conference platform can enable a significant number of client devices (e.g., up to one hundred or more client devices) to be connected via the video conference.

In some instances, a video conference platform can enable a live stream of the video conference, e.g., participants can connect to and/or participate in the video conference in real-time. In some instances, the video conference platform can provide a recording of the video conference for playback, e.g., participants can consume (e.g., watch) a recording of the video conference after a live stream of the video conference has begun or after it has ended. For example, the live stream of the video conference can be scheduled to occur at a particular time convenient for certain participants. For example, the scheduled time can be convenient for participants who live in a certain time zone and/or who do not have a conflict at the scheduled time. Those participants can consume the live stream of the video conference at the scheduled time (e.g., in real-time). However, there can be instances where the scheduled time for the live stream of the video conference is not convenient for other participants, such as participants who live in another time zone and/or participants who have a conflict at the scheduled time. Those participants can consume a recording of the video conference at a later time (e.g., at a time after the scheduled time for the live stream of the video conference).

However, the recording of the video conference is often lacking in video resolution and quality. For example, during playback of the recording of the video conference, each video stream of a participant of the live stream of the video conference is typically pre-composited into a single stream with a fixed resolution and/or fixed aspect ratio. However, during the live stream of the video conference, participants may have participated in the live stream with a wider range of resolutions of their video streams and shared content (e.g., 240p to 1080p resolution). The resolution quality of the recording of the video conference would thus be limited to a fixed resolution rather than a wider range of resolutions. A fixed resolution could make the recording of the video conference blurry when watching the recording on a larger device screen size. The recording of the video conference could also be limited to a fixed aspect ratio, which could inhibit users from being able to zoom in and out of video streams, e.g., to view fine details in shared content such as hard-to-read illustrations. As a result, users often have to replay portions of the video conference multiple times to be able to discern desired information from the recording of the video conference, thereby needlessly consuming computing resources of the platform and/or the client devices that replay portions of the video conference. The consumed resources are unavailable to other processes of the system, which can reduce an overall efficiency and increase an overall latency of the system.

Further, users who consume the recording typically cannot interact with the recording of the video conference as participants can interact with the video conference during the live stream. For example, during the live stream of the video conference, participants can interact with other participants by sending emojis, attaching links to files, attaching uniform resource locators (URLs), sending a chat message, participating in a poll, etc. During playback of the recording, users typically can only view the aforementioned interactions from the participants of the live stream at corresponding time points during the recording. However, those users typically cannot interact in the same way or at all with the recording of the video conference, and may have to switch to other platforms and/or applications to provide desired feedback. The switching would result in consumption of additional resources of respective client devices and/or other platforms that allow users to provide desired feedback.

Implementations of the present disclosure address the above and other deficiencies by providing an interactive playback of a video conference. Each participant's source video stream presented in a user interface (UI) on a first client device during a live stream of a video conference can be captured (e.g., recorded). The user interaction events that occur at one or more time points during the live stream can also be captured (e.g., recorded). Each source video stream can be sent to a second client device for playback of the video conference (e.g., for a participant to watch a recording of the video conference). Each source video stream can be visually rendered (e.g., displayed) in a UI on the second client device in the same layout as each video stream was presented in the UI on the first client device. User interaction events that occur during playback of the video conference at the second client device can also be captured. Each of the user interaction events that were captured at the first client device during the live stream of the video conference and at the second client device during the playback of the video conference can be visually rendered (e.g., displayed) during playback of the video conference, as well as during subsequent playbacks of the video conference (e.g., at other client devices).

Aspects of the present disclosure provide technical advantages over previous solutions. Aspects of the present disclosure can provide an additional functionality to the video conference tool of the video conference platform that improves playback of recordings of video conferences such that participants can consume recordings at a level of immersion that approaches being present at the live stream of the video conference itself. Playback of the video conference can be interactive by allowing participants to interact with the recording, capturing their interactions, and displaying their interactions during playback of the video conference, as well as during subsequent playbacks of the video conference. Further, the quality of the recording of the video conference can be improved by sending each source video stream to the client device for visual rendering (e.g., display) rather than sending a pre-composited stream with a fixed resolution and/or fixed aspect ratio. Thus, playback of the video conference can provide the original resolution of each video stream from the live stream, which can allow participants who are consuming the recording to more easily zoom in and zoom out of video streams, e.g., to view fine details in shared content such as hard-to-read illustrations. As a result, user's repetitive replaying of the video conference is avoided, as well as users' switching to other platforms and/or applications to provide desired feedback. As the above operations are no longer needed, respective computing resources are no longer wasted, and an overall efficiency and overall latency of the system are improved.

Figure 1:
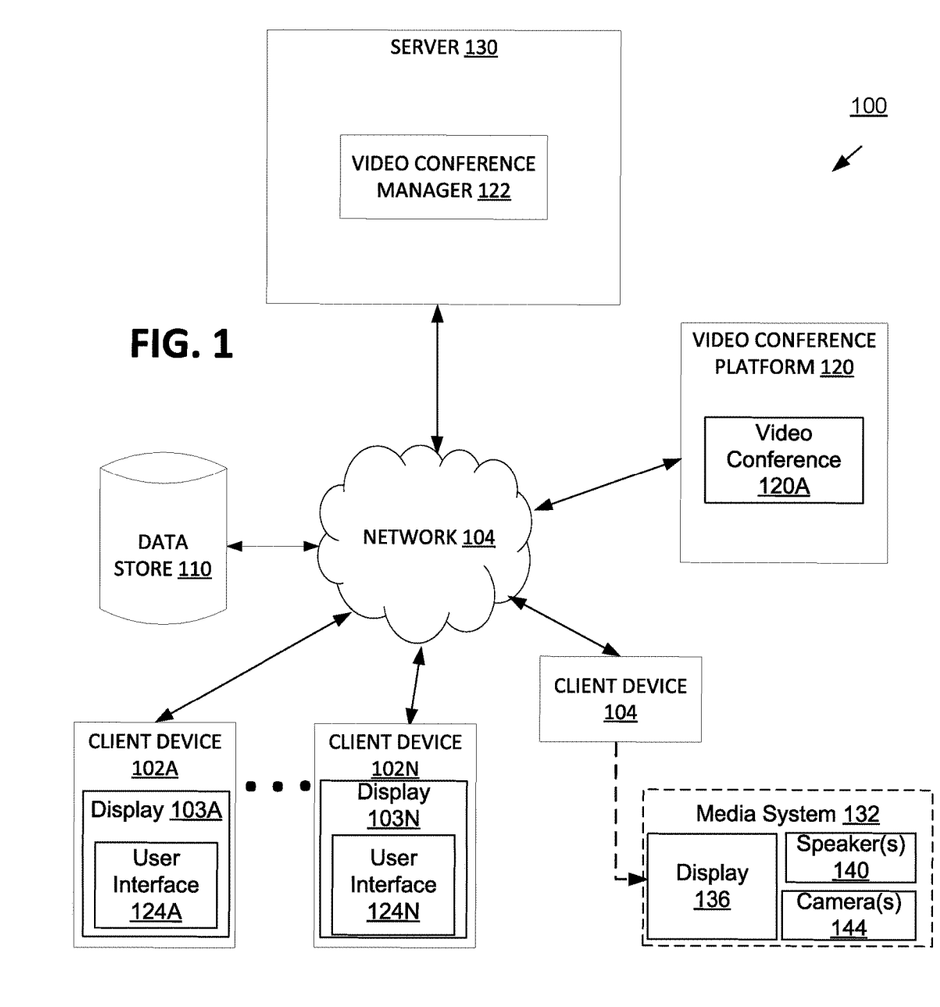
FIG. 1 illustrates an example system architecture, in accordance with implementations of the present disclosure.

FIG. 1 illustrates an example system architecture 100, in accordance with implementations of the present disclosure.

The system architecture 100 (also referred to as "system" herein) includes client devices 102A-N, one or more client devices 104, a data store 110, a video conference platform 120, and a server 130, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by video conference platform 120 or one or more different machines (e.g., the server 130) coupled to the video conference platform 120 via network 104. In some implementations, the data store 110 can store portions of audio and video streams received from the client devices 102A-102N for the video conference platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users. In some implementations, the data store 110 can store one or user interaction events received from the client devices 102A-102N as described in more detail with respect to FIG. 3.

Video conference platform 120 can enable users of client devices 102A-102N and/or client device(s) 104 to connect with each other via a video conference (e.g., a video conference 120A). A video conference (also referred to herein as a "live stream of a video conference") refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Embodiments of the present disclosure can be implemented with any number of participants connecting via the video conference (e.g., up to one hundred or more).

The client devices 102A-102N may each include computing devices such as personal computers (PCs), laptops, mobile phones, smart phones, tablet computers, netbook computers, network-connected televisions, etc. In some implementations, client devices 102A-102N may also be referred to as "user devices." Each client device 102A-102N can include an audiovisual component that can generate audio and video data to be streamed to video conference platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, video conference platform 120 is coupled, via network 104, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 104). Users that are physically present in the room can use media system 132 rather than their own devices (e.g., client devices 102A-102N) to participate in a video conference, which may include other remote users. For example, the users in the room that participate in the video conference may control the display 136 to show a slide presentation or watch slide presentations of other participants. Sound and/or camera control can similarly be performed. Similar to client devices 102A-102N, client device(s) 104 can generate audio and video data to be streamed to video conference platform 120 (e.g., using one or more microphones, speakers 140 and cameras 144).

Each client device 102A-102N or 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access video conference platform 120. For example, a user of client device 102A can join and participate in a video conference via a UI 124A presented on the display device 103A by the web browser or client application. A user can also present a document to participants of the video conference via each of the UIs 124A-124N. Each of the UIs 124A-124N can include multiple regions to present visual items corresponding to video streams of the client devices 102A-102N provided to the server 130 for the video conference.

In some implementations, server 130 can include a video conference manager 122. Video conference manager 122 is configured to manage a video conference between multiple users of video conference platform 120. In some implementations, video conference manager 122 can provide the UIs 124A-124N to each client device to enable users to watch and listen to each other during a live stream of a video conference and/or during playback of a recording of the video conference. Video conference manager 122 can also collect and provide data associated with the video conference to each participant of the video conference. In some implementations, video conference manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 102A-102N or the client device 104. The native application may be separate from a web browser. In some embodiments, the video conference manager 122 can provide an interactive playback of a video conference. Further details with respect to the video conference manager 122 are described with respect to FIG. 3.

As described previously, an audiovisual component of each client device can capture images and generate video data (e.g., a video stream) of the captured data of the captured images. In some implementations, the client devices 102A-102N and/or client device(s) 104 can transmit the generated video stream to video conference manager 122. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to video conference manager 122.

The video conference manager 122 can include a video stream processor. The video stream processor can be combined together or separated into further components, according to a particular implementation. It should be noted that in some implementations, various components of the video conference manager 122 may run on separate machines. The video stream processor can receive video streams from the client devices (e.g., from client devices 102A-102N and/or 104). In some implementations, the video stream processor can receive audio streams associated with the video streams from the client devices (e.g., from an audiovisual component of the client devices 102A-102N).

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It should be noted that in some other implementations, the functions of server 130 or video conference platform 120 may be provided by a fewer number of machines. For example, in some implementations, server 130 may be integrated into a single machine, while in other implementations, server 130 may be integrated into multiple machines. In addition, in some implementations, server 130 may be integrated into video conference platform 120.

In general, functions described in implementations as being performed by video conference platform 120 or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations may also be generally applied to any type of telephone call or conference call between users. Implementations of the disclosure are not limited to video conference platforms that provide video conference tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2A:
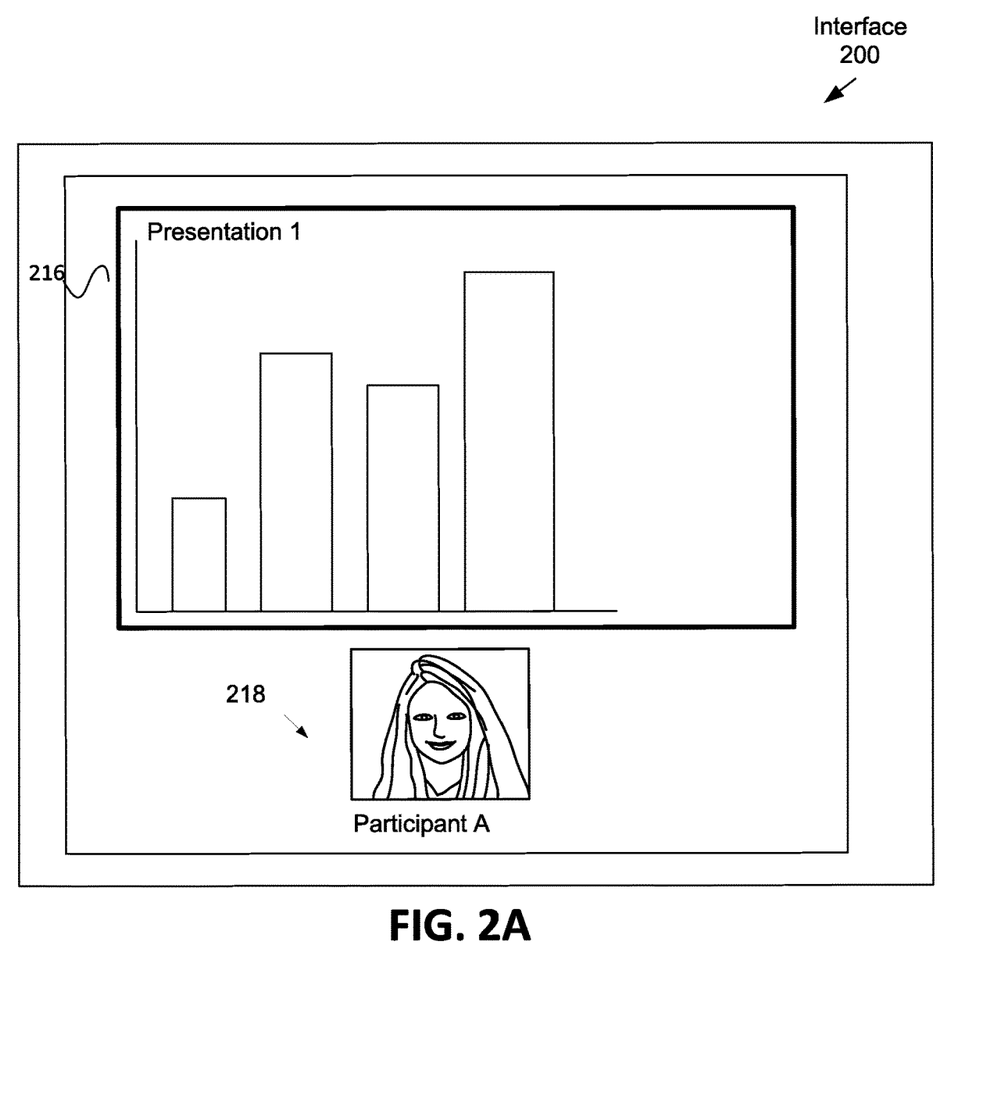
FIG. 2A illustrates an example user interface (UI) on a client device during a live stream of a video conference, in accordance with implementations of the present disclosure.

FIG. 2A illustrates an example user interface 200 on a client device during a live stream of a video conference, in accordance with some embodiments of the present disclosure. The UI 200 can be generated by the video conference manager 122 of FIG. 1 for presentation at a client device (e.g., client devices 102A-102N and/or 104). Accordingly, the UI 200 can be generated by one or more processing devices of the server 130 of FIG. 1. In some implementations, the video conference between multiple participants can be managed by the video conference platform 120. As illustrated, the video conference manager 122 can provide the UI 200 to enable participants (e.g., participant A) to join and participate in the video conference.

UI 200 can include multiple regions, including a first region 216 and a second region 218. The first region 216 displays a visual item corresponding to video data (e.g., a video stream) of a document being presented. A document can be a slide presentation, a word document, a spreadsheet document, a web page, or any other document that can be presented. In one implementation, a client device can open (e.g., in response to a user operation) a document on the screen using an appropriate document application and share (e.g., in response to a user operation) the screen presenting the document with client devices of the other participants by providing a video stream of the document. The second region 218 can display a visual item corresponding to video data captured and/or streamed by a client device associated with Participant A. As illustrated, the first region 216 can correspond to a "main region," e.g., an area in the UI 200 that is placed at or near the center or a focus area of the UI 200. In some embodiments, the second region 218 can correspond to a "thumbnail region." A thumbnail region can refer to an area of the UI 200 that can be located along a side (e.g., a bottom side) of the UI 200. Similar to the main region, the thumbnail region is also associated with a video stream received from the client device and displays the video stream. However, the thumbnail region spans a smaller area than the main region, thereby presenting images of the associated video stream in a relatively smaller scale than the main region. In some embodiments, the first region 216 is relatively bigger than the second region 218 to catch the attention of participants in the video conference (e.g., users of the client devices). In some implementations, there can be more than one main region. In some implementations, each region is of the same or similar size as the size of each other region. In some implementations, the first region 216 can be used to display a video stream from a client device associated with an active and/or current speaker and/or presenter of the video conference.

In some implementations, the video conference manager 122 can associate each region with a visual item corresponding to a video stream received from a client device. For example, the processing device can determine that the second region 218 is to display a visual item corresponding to a video stream from the client device of Participant A (e.g., based on an identifier associated with each client device and/or each participant). In some implementations, this can be done automatically without any user input specifying which visual item is to be displayed in the second region 218 in the UI 200.

In some embodiments, the UI 200 can include one or more UI elements that enable participants to interact with the video conference during the live stream. For example, the one or more UI elements can include a "button" and/or "drop-down" to provide an emoji reaction from a participant to one or more other participants. In some embodiments, providing an emoji reaction can include one or more emojis being animated across a display of the UI (e.g., the display 103A of FIG. 1). In some examples, the one or more UI elements can include a "button" and/or "text box" to annotate (e.g., label) a time point by a participant, provide a link to a file by a participant, provide a uniform resource locator (URL) by a participant, send and/or receive a communication associated with a chat function between a participant and one or more other participants, send and/or receive a communication associated with a poll between a participant and one or more other participants, etc.

Figure 2B:
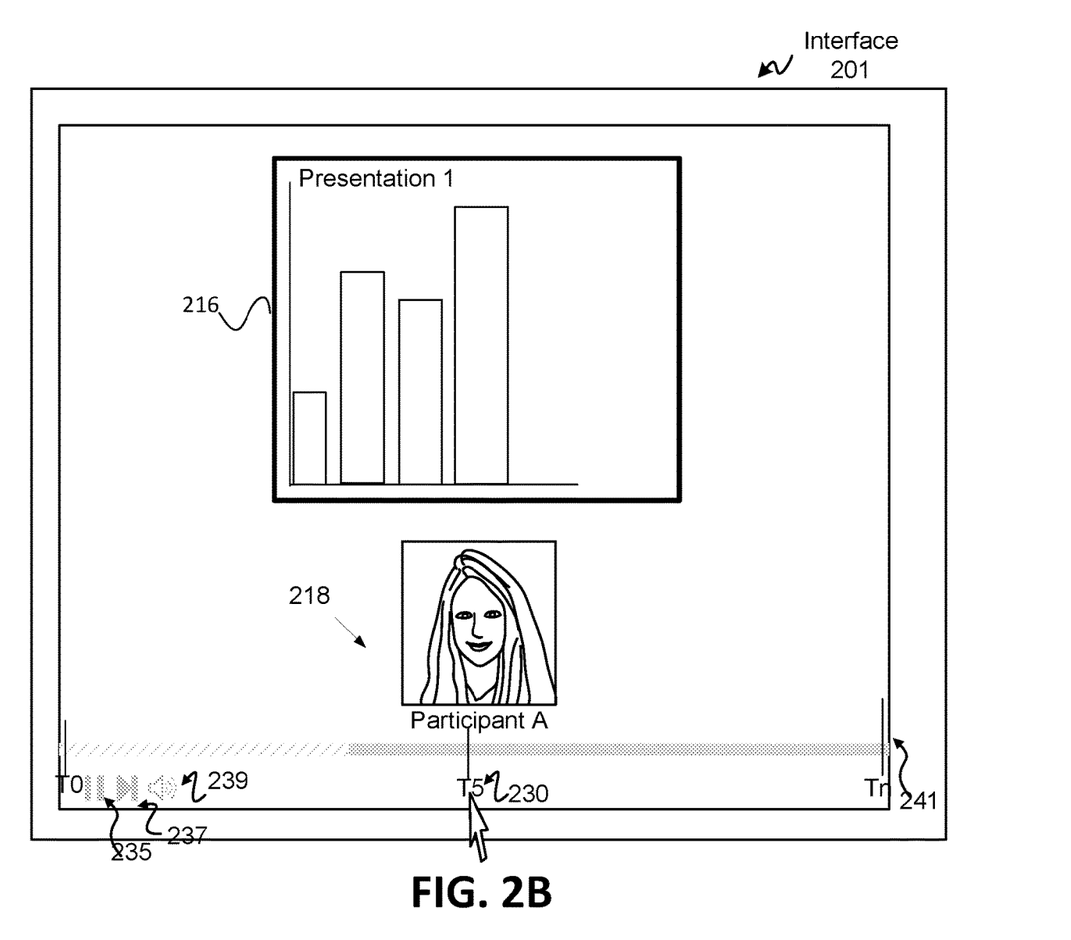
FIG. 2B illustrates an example UI on a client device during playback of a video conference, in accordance with implementations of the present disclosure.

FIG. 2B illustrates an example UI 201 on a client device during playback of a video conference (e.g., the live stream of the video conference presented in UI 200 of FIG. 2A), in accordance with implementations of the present disclosure. The UI 201 may be provided by an application of a client device (e.g., client devices 102A-102N and/or 104). The application may be a web browser or another application associated with/provided by a platform, such as video conference platform 120, including a mobile application, a desktop application, or the like. In some implementations, the client device can receive one or more source video streams from the server 130 (e.g., the video conference manager 122 of FIG. 1) for visual rendering in the UI 201. The one or more source video streams can be source video streams from the live stream of the video conference presented in the UI 200 of FIG. 2A.

In some implementations, the client device can receive a set of user interaction events from the server 130 (e.g., the video conference manager 122 of FIG. 1) for visual rendering in the UI 201. The set of user interaction events can include one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants, etc. User interaction with various elements of the UI 201 can cause changes to the interface elements presented. Various interactions between the UI 201 and interface elements presented in FIG. 2B are possible, and any interactions between sample interfaces, similar interfaces, inclusion of similar interface elements, etc., are within the scope of this disclosure.

In some embodiments, the UI 201 can include one or more UI elements that enable a participant to initiate playback of the video conference (e.g., a "play" button), pause playback of the video conference (e.g., a "pause" button 235), and/or rewind or fast-forward playback of the video conference (e.g., a "fast-forward" button 237), a playback speed button, etc. In another example, the UI 201 can include a scroll bar 241 (e.g., a time bar), where each portion of the scroll bar represents a different time point (e.g., T0-Tn) within the video conference. In some embodiments, late joiners need to be able to join the live stream of the video conference and potentially fast-forward, e.g., by using the fast-forward button 237, to skip sections of content or playback content, e.g., by using the playback speed button, at, for example, 1.x (e.g., 1.5) speed to ultimately reach the "playhead" (e.g., a UI element indicating a current time point of the real-time live stream) and view real-time content. In addition, participants, regardless of join time, might experience disruptions in their viewing experience putting them in the same position as late joiners. There might be doorbells ringing, urgent phone calls, or users just juggling everyday chores while viewing a live stream video conference out of their own time zone. In some embodiments, the playback speed button can be above or below 1.0 speed. In some embodiments, a playback speed above 1.0 can be used to skip sections of content quicker to reach real-time content of the video conference during a live stream, and/or to compress the viewing experience of the live stream due to time constraints. In some embodiments, a playback speed below 1.0 can be used for accessibility, e.g., to consume foreign language material and/or to slow down playback of a video conference involving complex or challenging topics.

In some embodiments, the UI 201 can include one or more UI elements to enable a participant to control an audio of the video conference (e.g., a "volume" button 239). In some embodiments, the UI 201 can present a representation of a cursor 230. Cursor 230 may be controlled by an input device (e.g., mouse, trackpad, trackball, joystick, etc.) of a client device of a participant of video conference platform 120 of FIG. 1. As illustrated in FIG. 2, the cursor 230 can be proximate to a portion of the scroll bar 241 representing time point T5 within the video conference.

In some embodiments, the UI 201 can include one or more UI elements that enable the participant to interact with the recording of the video conference during playback. For example, the one or more UI elements can include a "button" and/or "drop-down" to provide an emoji reaction from a participant to one or more other participants. In some embodiments, providing an emoji reaction can include one or more emojis being animated across a display of the UI (e.g., the display 103A of FIG. 1). In some embodiments, the movement of the one or more emojis can adapt to the window aspect ratio used for the display of the UI, since a participant who is playing back the video conference will be using any window aspect ratio that cannot be determined at the time of recording the video conference. In some examples, the one or more UI elements can include a "button" and/or "text box" to annotate (e.g., label) a time point by a participant, provide a link to a file by a participant, provide a uniform resource locator (URL) by a participant, send and/or receive a communication associated with a chat function between a participant and one or more other participants, send and/or receive a communication associated with a poll between a participant and one or more other participants, etc.

Figure 3:
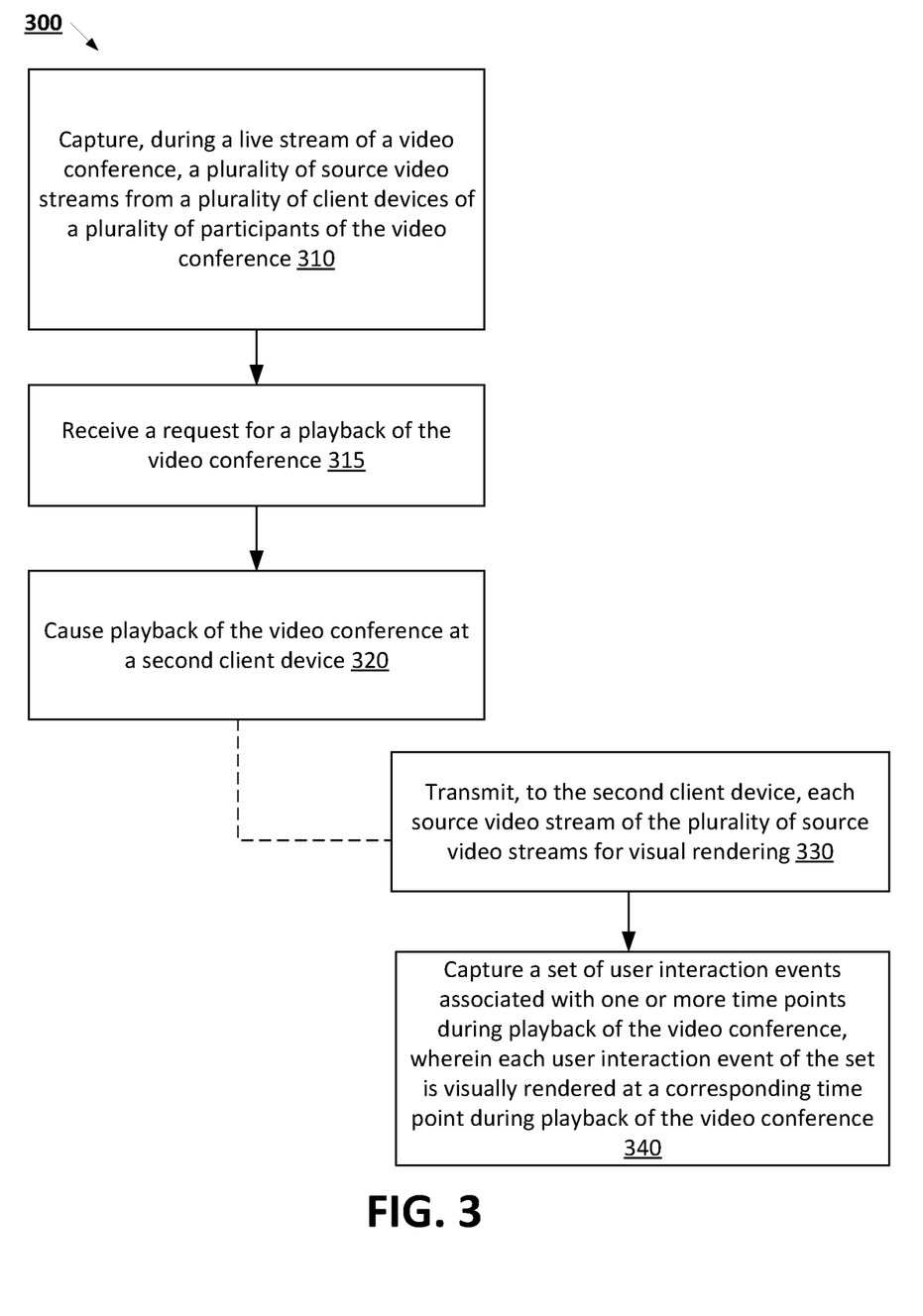
FIG. 3 depicts a flow diagram of a method for providing interactive playback of a video conference, in accordance with implementations of the present disclosure.

FIG. 3 depicts a flow diagram of a method 300 for providing interactive playback of a video conference, in accordance with implementations of the present disclosure. Method 300 may be performed by processing logic that may include hardware (circuitry, dedicated logic, etc.), software (e.g., instructions run on a processing device), or a combination thereof. In one implementation, some or all the operations of method 300 may be performed by one or more components of system 100 of FIG. 1 (e.g., video conference platform 120, server 130 and/or video conference manager 122).

For simplicity of explanation, the method 300 of this disclosure is depicted and described as a series of acts. However, acts in accordance with this disclosure can occur in various orders and/or concurrently, and with other acts not presented and described herein. Furthermore, not all illustrated acts may be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 310, the processing logic captures, during a live stream of a video conference (e.g., the video conference 120A of FIG. 1), a set (e.g., a plurality) of source video streams from a set of client devices (e.g., the client devices 102A-102N and/or 104 of FIG. 1) of a set of participants of the video conference. In some embodiments, each source video stream is presented according to a particular layout of a video conference user interface (UI) (e.g., a UI 124A of the UIs 124A-124N of FIG. 1) on a first client device (e.g., client device 102A of FIG. 1). For example, some video conference platforms can include a layout where a single region is presented in the UI, where the single region displays a video stream of a participant who is actively speaking in the video conference. In another example, some video conference platforms can include a layout where two or more regions are presented in the UI, where each region displays a video stream of each participant who has spoken or is actively speaking. In some embodiments, the UI includes a set of regions to display a set of visual items, where each visual item corresponds to one of a set of video streams from the set of client devices. In some embodiments, a video stream can correspond to a series of images captured by a camera of a client device and subsequently encoded for transmission over a network in accordance with, for example, H.264 standard. In some embodiments, the video stream can correspond to screen image data of a document presented on a display device of a client device. A document can be a slide presentation, a word document, a spreadsheet document, a web page, or any other document that can be presented. In some embodiments, each video stream can be associated with an audio stream corresponding to audio data collected by a microphone of a client device and subsequently encoded (e.g., compressed and packetized) for transmission over a network. The audio data can be encoded according to a standard such as MP3, etc.

In some embodiments, capturing the set of source video streams can include identifying a source video stream that is currently visible in the UI of the first client device. For example, using FIG. 2A as an illustrative example, the processing logic can capture the source video streams in region 216 and region 218, which are currently visible in the UI of FIG. 2A. In some embodiments, in response to identifying the source video stream currently visible in the UI of the first client device, the processing logic can record the source video stream for a time period during which the source video stream is currently visible in the UI of the first client device. In some embodiments, the processing logic can determine that the source video stream is no longer visible in the UI of the first client device (e.g., the processing logic can identify that the source video stream is not currently visible in the UI of the first client device). In response to determining that the source video stream is no longer visible in the UI of the first client device, the processing logic can pause the recording of the source video stream until the source video stream becomes visible in the UI of the first client device.

In some embodiments, the processing logic captures a set (e.g., a first set) of user interaction events that are associated with one or more time points during the live stream of the video conference. The user interaction events can include one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants, etc. In some embodiments, the processing logic can store the first set of user interaction events in a data channel (e.g., the data store 110 of FIG. 1). In some embodiments, the data channel can include mappings of individual time points and one or more user interaction events captured at each individual time point during the live stream of the video conference. In some embodiments, each user interaction event of the first set of user interaction events can be associated with a corresponding label and/or annotation that indicates that the user interaction event is captured during the live stream of the video conference. In some embodiments, the corresponding label and/or annotation can be stored with the user interaction event in the data channel.

At block 315, the processing logic receives a request for a playback of a video conference (e.g., the video conference 120A of FIG. 1). In some embodiments, the processing logic can receive the request for the playback of the video conference from a user of another client device (e.g., a second client device, such as client device 102N of FIG. 1).

At block 320, the processing logic causes playback of the video conference at the second) client device. In some embodiments, causing playback of the video conference at the second client device can include transmitting, at block 330, to the second client device, each source video stream captured at block 310 for visual rendering (e.g., display) in a UI on the second device. In some embodiments, causing playback of the video conference can include, at block 340, capturing another (e.g., a second) set of user interaction events associated with one or more time points during playback of the video conference. Such a playback of the video conference allows the user of the second client device to experience a level of immersion that resembles the experience of a user participating in the live event itself.

In some embodiments, each source video stream is visually rendered according to the particular layout for each video source video stream during the live stream of the video conference. In some embodiments, the processing logic causes each user interaction event of the first set of user interaction events and/or the second set of user interaction events to be visually rendered (e.g., displayed) in the UI on the second client device during playback of the video conference and/or during subsequent playbacks of the video conference (e.g., at the second client device or another client device). In some embodiments, the processing logic can store the second set of user interaction events in a data channel (e.g., the data store 110 of FIG. 1). In some embodiments, the data channel can include a mapping of each time point and one or more user interaction events captured at each time point during playback of the video conference. In some embodiments, each user interaction event of the second set of user interaction events can be associated with a corresponding label and/or annotation that indicates that the user interaction event is captured during playback of the video conference. In some embodiments, the corresponding label and/or annotation can be stored with the user interaction event in the data channel. In some embodiments, each user interaction event of the first set of user interaction events can be associated with a corresponding label and/or annotation that indicates that the user interaction event is captured during the live stream of the video conference. In some embodiments, the corresponding label and/or annotation can be stored with the user interaction event in the data channel. In some embodiments, the second set of user interaction events can be visually rendered at the corresponding time point during playback of the video conference in response to a permission setting enabled by a host participant of the video conference. For example, the host participant of the video conference can enable permission settings for playback of the video conference to allow only the first set of user interaction events to be visually rendered at the corresponding time point during playback of the video conference. In some embodiments, the host participant can enable permission settings for playback of the video conference to allow only the second set of user interaction events to be visually rendered at the corresponding time point during playback of the video conference. In some embodiments, the host participant can enable permission settings for playback of the video conference to allow all user interaction events (e.g., the user interaction events of the first set and/or the second set) to be visually represented at the corresponding time point during playback of the video conference.

In some embodiments, causing playback of the video conference can include providing one or more UI elements for controlling playback of the video conference. For example, the one or more UI elements can include a "play" button, a "pause" button, a "skip" and/or "fast-forward" button, a "rewind" button, a "playback speed" button, etc. For example, using FIG. 2B as an illustrative example, the one or more UI elements can include one or more UI elements that enable the user to initiate playback of the video conference (e.g., a "play" button), pause playback of the video conference (e.g., a "pause" button 235), and/or rewind or fast-forward playback of the video conference (e.g., a "fast-forward" button 237), a playback speed button, etc.

In some embodiments, causing playback of the video conference can include determining a particular time point at which to initiate playback of the video conference. In some embodiments, the particular time point can be set by a host participant of the video conference. The processing logic can cause playback of the video conference to be initiated at the particular time point.

Figure 4:
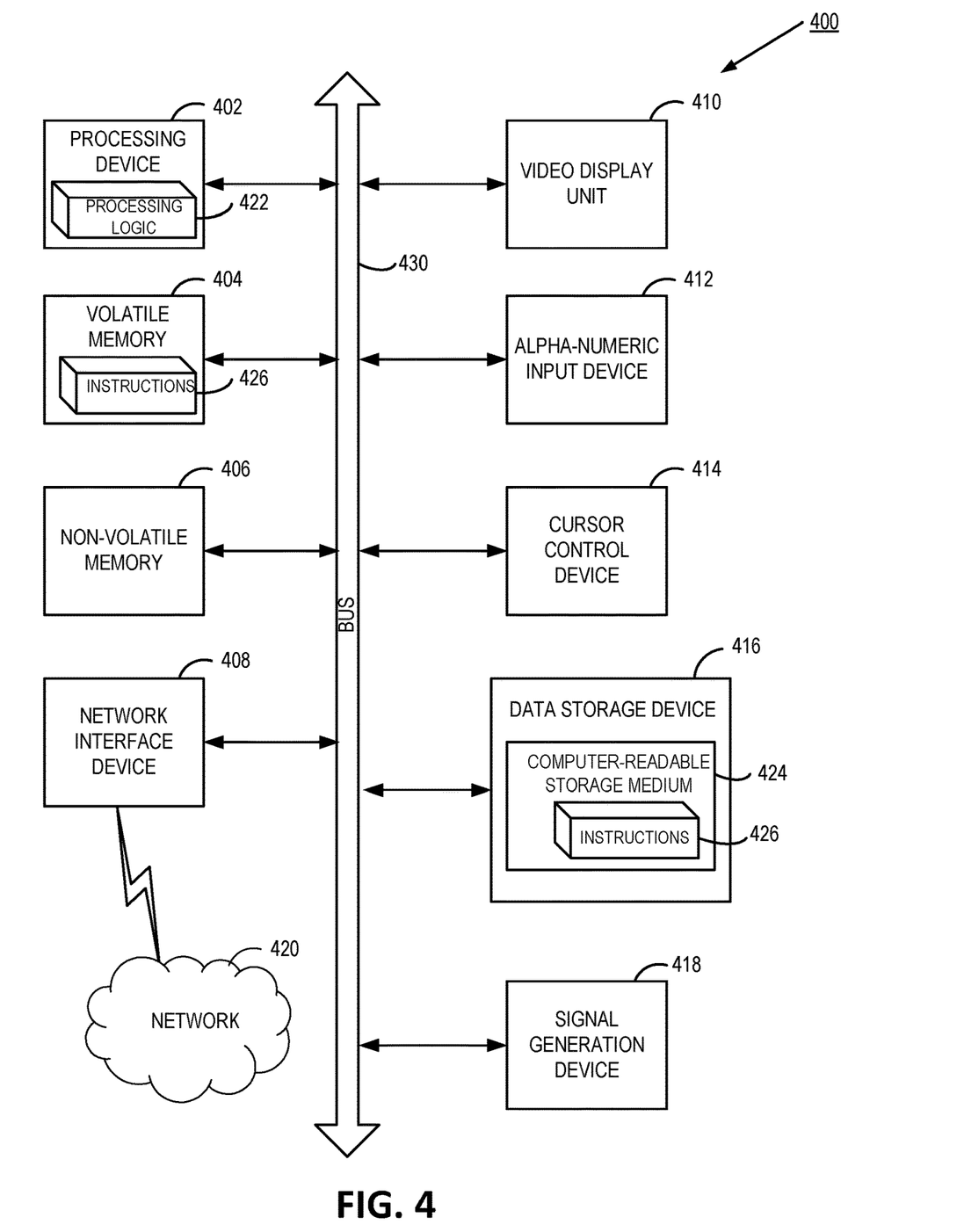
FIG. 4 is a block diagram illustrating an exemplary computer system, in accordance with implementations of the present disclosure.

FIG. 4 is a block diagram illustrating an exemplary computer system, in accordance with implementations of the present disclosure. The computer system 400 can be the server 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 405 (e.g., for providing interactive playback of a video conference) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 514 (e.g., a mouse), and a signal generation device 420 (e.g., a speaker).

The data storage device 418 can include a non-transitory machine-readable storage medium 424 (or a computer-readable storage medium on which is stored one or more sets of instructions 405 (e.g., for providing interactive playback of a video conference) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for providing interactive playback of a video conference. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    capturing, during a live stream of a video conference, a plurality of source video streams from a plurality of client devices of a plurality of participants of the video conference and a first set of user interaction events associated with one or more time points during the live stream of the video conference, wherein capturing the plurality of source video streams comprises pausing and resuming recording of a first source video stream of the plurality of source video streams based on visibility of the first source video stream in a video conference user interface (UI);
    receiving, from a first client device of the plurality of client devices, a request for a playback of the video conference; and
    causing playback of the video conference at a second the first client device, wherein causing playback of the video conference comprises:
        transmitting, to the first client device, the plurality of source video streams for visual rendering on the first client device;
        capturing a second set of user interaction events associated with one or more time points during playback of the video conference; and
        causing the first set of user interaction events and the second set of user interactions to be visually rendered at corresponding time points during playback of the video conference.

2. The method of claim 1, wherein capturing the plurality of source video streams comprises:
    identifying a second source video stream currently visible in the video conference UI; and
    recording the second source video stream for a time period during which the second source video stream is currently visible in the video conference UI.

3. The method of claim 2, further comprising:
    determining that the second source video stream is no longer visible in the video conference UI; and
    pausing the recording of the second source video stream until the second source video stream becomes visible in the video conference UI of the first client device.

4. The method of claim 1, wherein the first set of user interaction events and the second set of user interaction events comprise one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants.

5. The method of claim 1, wherein causing playback of the video conference further comprises:
    providing one or more UI elements for controlling playback of the video conference, wherein the one or more UI elements comprise one or more of a play button, a pause button, a skip button, a rewind button, or a playback speed button.

6. The method of claim 1, wherein causing playback of the video conference further comprises:
    determining a particular time point at which to initiate playback of the video conference, wherein the particular time point is set by a host participant of the video conference; and
    causing playback of the video conference to be initiated at the particular time point.

7. The method of claim 1, further comprising:
    storing the first set of user interaction events and the second set of user interaction events in a data channel, wherein the data channel comprises a mapping of each time point of the one or more time points and one or more user interaction events captured at each time point, and wherein each user interaction event of the first set of user interaction events and the second set of user interaction events in the data channel is visually rendered at the corresponding time point during subsequent playbacks of the video conference.

8. The method of claim 1, wherein the second set of user interaction events is associated with a corresponding label indicating that the second set of user interaction events is captured during playback of the video conference, and wherein the first set of user interaction events is associated with a corresponding label indicating that the first set of user interaction events is captured during the live stream of the video conference.

9. The method of claim 1, wherein each of the first set of user interaction events and each of the second set of user interaction events is visually rendered at each associated time point during playback of the video conference in response to a permission setting enabled by a host participant of the video conference.

10. A system comprising: a memory device; and
a processing device coupled to the memory device, the processing device to perform operations comprising:
capturing, during a live stream of a video conference, a plurality of source video streams from a plurality of client devices of a plurality of participants of the video conference and a first set of user interaction events associated with one or more time points during the live stream of the video conference, wherein capturing the plurality of source video streams comprises pausing and resuming recording of a first source video stream of the plurality of source video streams based on visibility of the first source video stream in a video conference user interface (UI);
receiving, from a first client device of the plurality of client devices, a request for a playback of the video conference; and
causing playback of the video conference at the first client device, wherein causing playback of the video conference comprises:
transmitting, to the first client device, the plurality of source video streams for visual rendering on the first client device;
capturing a second set of user interaction events associated with one or more time points during playback of the video conference; and
causing the first set of user interaction events and the second set of user interactions to be visually rendered at corresponding time points during playback of the video conference.

11. The system of claim 10, wherein to capture the plurality of source video streams, the processing device is to perform operations comprising:
identifying a second source video stream currently visible in the video conference UI; and
recording the second source video stream for a time period during which the second source video stream is currently visible in the video conference UI.

12. The system of claim 11, wherein the processing device is to perform operations further comprising:
determining that the second source video stream is no longer visible in the video conference UI; and
pausing the recording of the second source video stream until the second source video stream becomes visible in the video conference UI of the first client device.

13. The system of claim 10, wherein the first set of user interaction events and the second set of user interaction events comprise one or more of providing an emoji reaction from a participant to one or more other participants, annotating a time point by a participant, providing a link to a file by a participant, providing a uniform resource locator (URL) by a participant, sending and/or receiving a communication associated with a chat function between a participant and one or more other participants, or sending and/or receiving a communication associated with a poll between a participant and one or more other participants.

14. The system of claim 10, wherein the processing device is to perform operations further comprising: storing the first set of user interaction events and the second set of user interaction events in a data channel, wherein the data channel comprises a mapping of each time point of the one or more time points and one or more user interaction events captured at each time point, and wherein each user interaction event of the first set of user interaction.

15. A non-transitory computer readable storage medium comprising instructions for a server that, when executed by a processing device, cause the processing device to perform operations comprising:
capturing, during a live stream of a video conference, a plurality of source video streams from a plurality of client devices of a plurality of participants of the video conference and a first set of user interaction events associated with one or more time points during the live stream of the video conference, wherein capturing the plurality of source video streams comprises pausing and resuming recording of a first source video stream of the plurality of source video streams based on visibility of the first source video stream in a video conference user interface (UI);
receiving, from a first client device of the plurality of client devices, a request for a playback of the video conference; and
causing playback of the video conference at the first client device, wherein causing playback of the video conference comprises:
transmitting, to the first client device, the plurality of source video streams for visual rendering on the first client device;
capturing a second set of user interaction events associated with one or more time points during playback of the video conference; and
causing the first set of user interaction events and the second set of user interactions to be visually rendered at corresponding time points during playback of the video conference.

16. The non-transitory computer readable storage medium of claim 15, wherein to capture the plurality of source video streams, the processing device is to perform operations comprising:
identifying a second source video stream currently visible in the video conference UI; and
recording the second source video stream for a time period during which the second source video stream is currently visible in the video conference UI.

* * * * *